(12) United States Patent
Merchant et al.

(10) Patent No.: US 6,261,448 B1
(45) Date of Patent: Jul. 17, 2001

(54) OIL FILTRATION AND HEAT EXCHANGE APPARATUS

(75) Inventors: Gerald Merchant, Red Deer; Norton Loblick; Jens Kluge, both of Edmonton, all of (CA)

(73) Assignee: Merch Performance Inc., Red Deer (CA)

( * ) Notice: Subject to any disclaimer, the term of this patent is extended or adjusted under 35 U.S.C. 154(b) by 0 days.

(21) Appl. No.: 09/350,781

(22) Filed: Jul. 9, 1999

(30) Foreign Application Priority Data

Jul. 10, 1998 (CA) .................................................. 2242836

(51) Int. Cl.[7] .................................................. B01D 35/18
(52) U.S. Cl. .......................... 210/184; 210/130; 210/424; 210/429; 210/440; 123/196 A; 165/916
(58) Field of Search ..................................... 210/130, 183, 210/184, 186, 420, 421, 440, 428, 168, 416.5, 419, 429, 431, 424; 123/196 A, 196 AB, 41.33; 184/104.3, 6.24; 165/51, 119, 916

(56) References Cited

U.S. PATENT DOCUMENTS

| | | | |
|---|---|---|---|
| 1,901,484 | * | 3/1933 | Winslow et al. . |
| 2,468,866 | * | 5/1949 | Collier . |
| 3,887,467 | * | 6/1975 | Johnson . |
| 5,476,139 | * | 12/1995 | Gire . |
| 5,520,801 | * | 5/1996 | Gerber et al. . |
| 5,740,772 | * | 4/1998 | Bluma . |

* cited by examiner

Primary Examiner—Joseph W. Drodge
Assistant Examiner—Terry K. Cecil
(74) Attorney, Agent, or Firm—Christensen O'Connor Johnson Kindness PLLC (57) ABSTRACT

Described is an oil filtration apparatus that includes external vanes 120 and associated outer flow passages 140 for allowing a heat exchange to occur between oil passing therein and cool air that passes by the vanes. A manually rotatable valve 154 is provided at one end of the filtration apparatus for controlling the flow of oil through the manifold. In a first position, the valve allows oil to flow through the outer flow passages through the end cap 152 and into an inner flow passage 142 where it is filtered before flowing through a central passage 134 and out the flow manifold. In a second position, the outer flow passages are blocked so that oil flows directly into the inner flow passage. A pressure sensitive valve 164 is provided in the end cap so that when the filter becomes clogged, oil is diverted directly to the central flow passage bypassing the filter. In a second embodiment, a rotatable valve cap 34 is provided on an end of the apparatus opposite the flow manifold and each of the outer flow passages 28 extends through a peripheral sidewall along one of the external vanes 26.

4 Claims, 10 Drawing Sheets

OIL FILTRATION AND HEAT EXCHANGE APPARATUS

FIELD OF THE INVENTION

The present invention relates to an oil filtration apparatus.

BACKGROUND OF THE INVENTION

All motor vehicles are equipped with some form of oil filtration apparatus. These oil filtration apparatus generally have a flow path with an inlet end an outlet end. A filter medium is disposed between the inlet end and the outlet end. All oil that passes from the inlet end to the outlet end of the oil filtration apparatus must pass through the filter medium.

When oil is exposed to high temperatures it begins to break down and loses its lubricating properties. It is, therefore, desirable in high performance applications to cool as well as filter the oil.

SUMMARY OF THE INVENTION

What is required is an oil filtration apparatus that is capable of cooling, as well as filtering, oil.

According to the present invention there is provided an oil filtration apparatus which includes an oil filtration apparatus which includes a housing having a peripheral sidewall, a first end, a second end, and an internal cavity. A plurality of external vanes extend outwardly from the peripheral sidewall. A flow manifold is positioned at the first end of the housing having an inlet and an outlet. A filter housing is disposed within the interior cavity of the housing having a sidewall with fluid flow openings and a central flow passage in communication with the outlet of the flow manifold. A divider is positioned within the interior cavity of the housing overlying the filter housing and dividing the interior cavity into at least one outer flow passage and at least one inner flow passage. The outer flow passage extends between the first end and the second end of the housing between the divider and the peripheral sidewall. The outer flow passage has a first end at the first end of the housing and a second end at the second end of the housing. The inner flow passage extends between the first end and the second end of the housing between the divider and the filter housing. The inner flow passage has a first end at the first end of the housing and a second end at the second end of the housing. An end cap at the second end of the housing permits fluid communication between the outer flow passage and the inner flow passage. The inlet of the flow manifold communicate with the first end of the outer flow passage with a heat exchange occurring between oil passing along the outer flow passage and cool air passing by the external vanes. As the oil reaches the end cap it is diverted into the second end of the inner flow passage. As the oil passes along the inner flow passage, the oil passes through the fluid flow openings in the filter housing and then through the central flow passage to the outlet of the flow manifold.

With the oil filtration apparatus, the oil is cooled by passing along the flow passages associated with the external vanes.

Although beneficial results may be obtained through the use of the oil filtration apparatus, as defined above, when the engine is cold or in cold weather conditions the cooling of the oil is no longer desirable. Even more beneficial results may, therefore, be obtained when a valve member for diverting liquids flowing through the inlet of the flow manifold is provided having a first position and a second position. When the valve member is in the first position the first end of the inner flow passage is blocked and liquids can only flow from the inlet of the flow manifold into the first end of the outer flow passage, with a heat exchange occurring between oil passing along the outer flow passage and cool air passing by the external vanes. As the oil reaches the end cap it is diverted into the second end of the inner flow passage. As the oil passes along the inner flow passage, the oil passes through the fluid flow openings in the filter housing and passes through the central flow passage to the outlet of the flow manifold. When the valve member is in the second position the first end of the outer flow passage is blocked and liquids can only flow from the inlet of the flow manifold into the first end of the inner flow passage. As the oil passes along the inner flow passage, the oil passes through the fluid flow openings in the filter housing and passes through the central flow passage to the outlet of the flow manifold.

With the provision of the valve member, as described above, the oil filtration apparatus can be adapted to suit any operating conditions merely by selecting between a cooling and filtering and a filtration only mode.

Although beneficial results may be obtained through the use of the oil filtration apparatus, as described above, an undesirable pressure build up can occur if the filter becomes clogged. Even more beneficial results may, therefore, be obtained when a diverter passage extends from flow cap to the central flow passage. A pressure sensitive valve member is positioned in the diverter passage, such that an increase in pressure within the housing as a result of a filter in the filter housing becoming plugs triggers the pressure sensitive valve permitting oil to be diverted through the diverter passage directly to the central flow passage without passing through the filter.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

A first preferred embodiment of an oil filtration apparatus generally identified by reference numeral 10, will now be described with reference to FIGS. 1 through 7.

Figure 1:
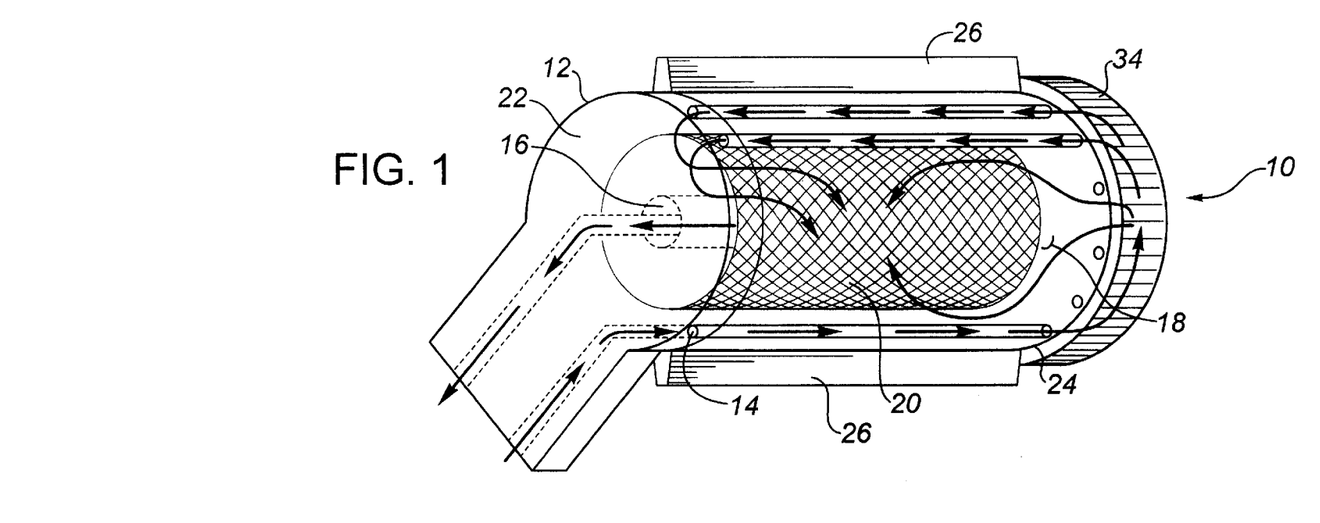
FIG. 1 is a side elevation view, in section, of an oil filtration apparatus constructed in accordance with the teachings of the present invention.
Figure 2:
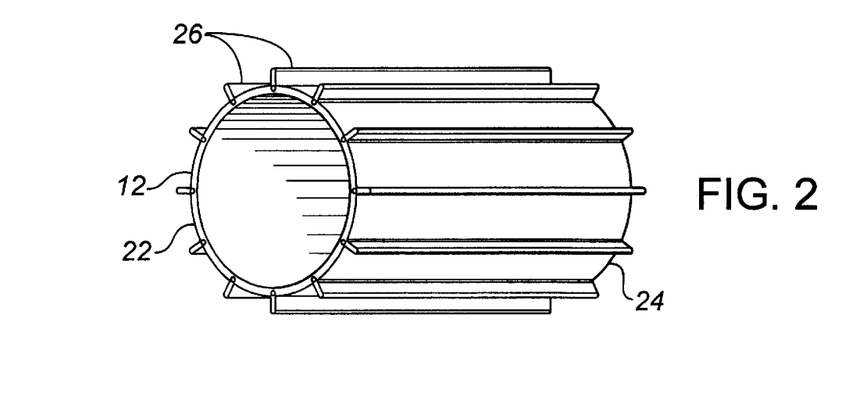
FIG. 2 is a perspective view of a housing for the oil filtration apparatus illustrated in FIG. 1.
Figure 3:
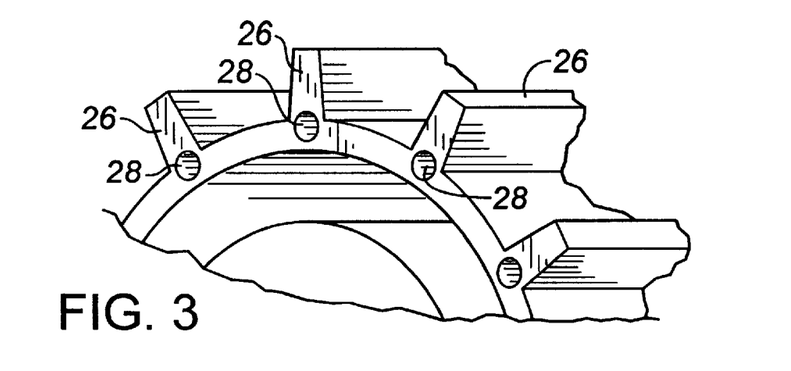
FIG. 3 is a magnified cross-sectional view of housing for the oil filtration apparatus illustrated in FIG. 2.
Figure 4:
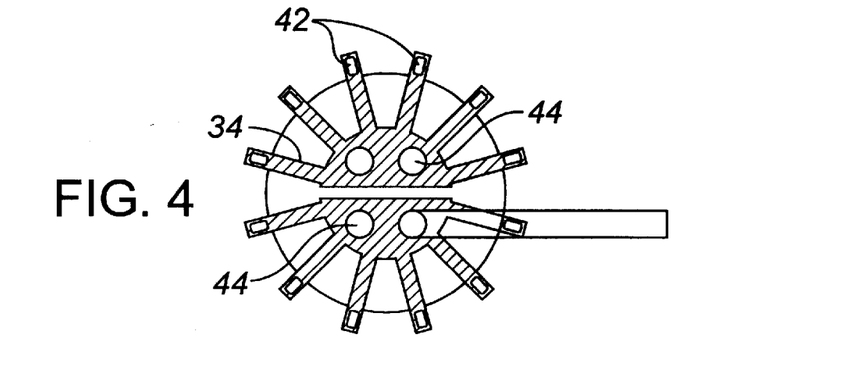
FIG. 4 is an end elevation view, in section, of the oil filtration apparatus illustrated in FIG. 1 with associated valve.
Figure 5:
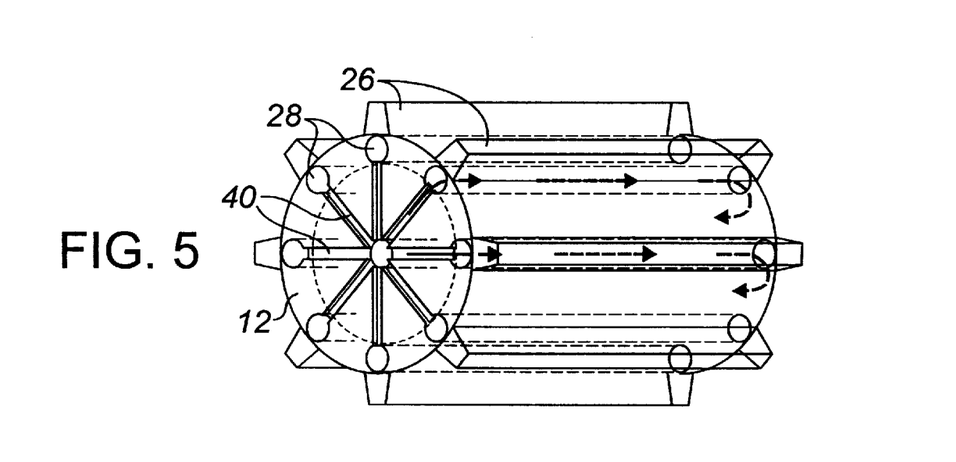
FIG. 5 is simplified perspective view, in section, of the oil filtration apparatus illustrated in FIG. 1.
Figure 6:
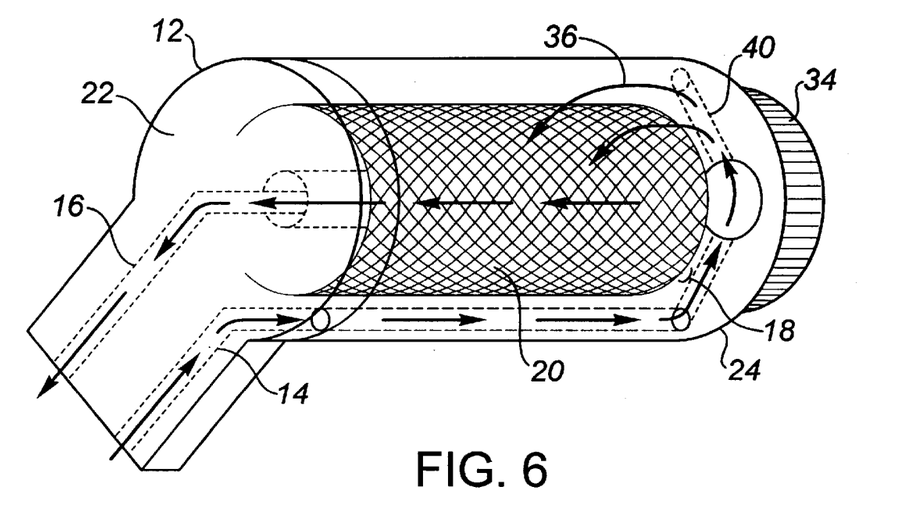
FIG. 6 is a side elevation view, in section, of the oil filtration apparatus illustrated in FIG. 1, showing a first flow path.
Figure 7:
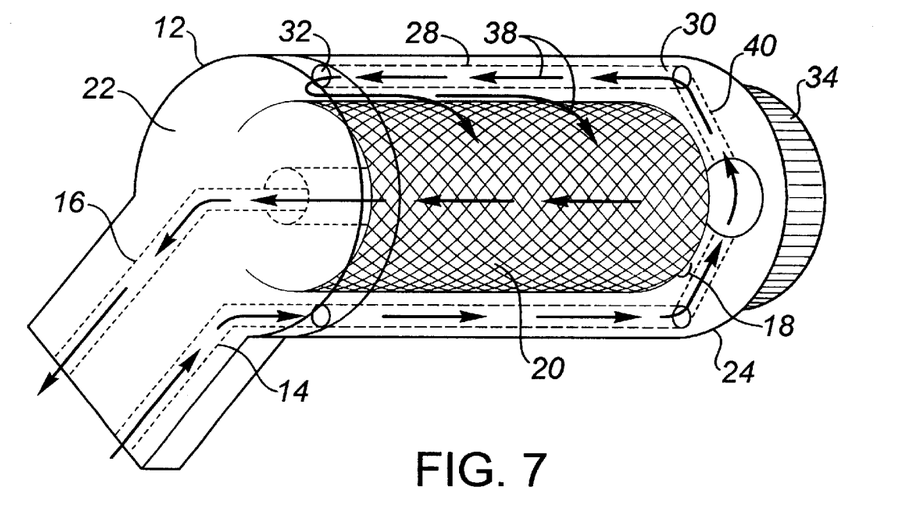
FIG. 7 is a side elevation view, in section, of the oil filtration apparatus illustrated in FIG. 1, showing a second flow path.

Referring to FIG. 1, oil filtration apparatus 10 includes a housing 12 having an inlet 14, an outlet 16, and a central filter retaining cavity 18 in which is positioned a stainless steel mesh filter 20. Housing 12 has a first end 22 and a second end 24. Referring to FIG. 2, a plurality of external vanes 26 extend between first end 22 and second end 24. Referring to FIG. 3, each of external vanes 26 has an associated flow passage 28. Referring to FIG. 7, each flow passage 28 has an inlet end 30 at second end 24 of housing 12 and an outlet end 32 at first end 22 of housing 12. Outlet end 32 of each of flow passages 28 communicates with central filter retaining cavity 18. Referring to FIG. 1, inlet 14 is in communication with a rotatable valve cap 34 which allows a selection to be made between a first flow path, as is indicated by arrows 36 in FIG. 6 and a second flow path, as is indicated by arrows 38 in FIG. 7. Referring to FIG. 5, in addition to flow passages 28, housing 12 has slots 40 that communicate with central filter retaining cavity 18. Referring to FIG. 4, rotatable valve cap 34 has peripheral passages 42 and central passages 44. In a first rotational position, peripheral passages 42 are out of register with flow passages 28. When peripheral passages 42 are out of register with flow passages 28, central passages 44 are in register with slots 40. This means that peripheral passages 42 are substantially blocked and substantially all oil flow entering valve cap 34 must pass through central passages 44 into central filter retaining cavity 18. Conversely, in a second rotational position, peripheral passages 42 are in register with flow passages 28. When peripheral passages 42 are in register with flow passages 28, central passages 44 are out of register with slots 40. This means that central passages 44 are substantially blocked and substantially all oil flow entering valve cap 34 must pass through peripheral passages 42 into flow passages 28. Referring to FIG. 6, the first flow path permits oil entering valve cap 34 to pass through slots 40 and communicate directly with filter retaining cavity 18. Oil following the first flow path through slots 40 must pass through stainless steel mesh filter 20 positioned within filter retaining cavity 18 in order to reach outlet 16. Referring to FIG. 7, the second flow path directs oil to inlet end 30 of flow passages 28 associated with external vanes 26. Referring to FIG. 3, oil following the second flow path passes through flow passages 28 with a heat exchange occurring between hot oil passing along flow passages 28 and cool air passing by external vanes 26. Referring to FIG. 7, oil exiting outlet end 32 of flow passages 28 enters filter retaining cavity 18 and must pass through stainless steel mesh filter 20 in order to reach outlet 16.

A second preferred embodiment of an oil filtration apparatus generally identified by reference numeral 100, will now be described with reference to FIGS. 8 through 15.

Figure 8:
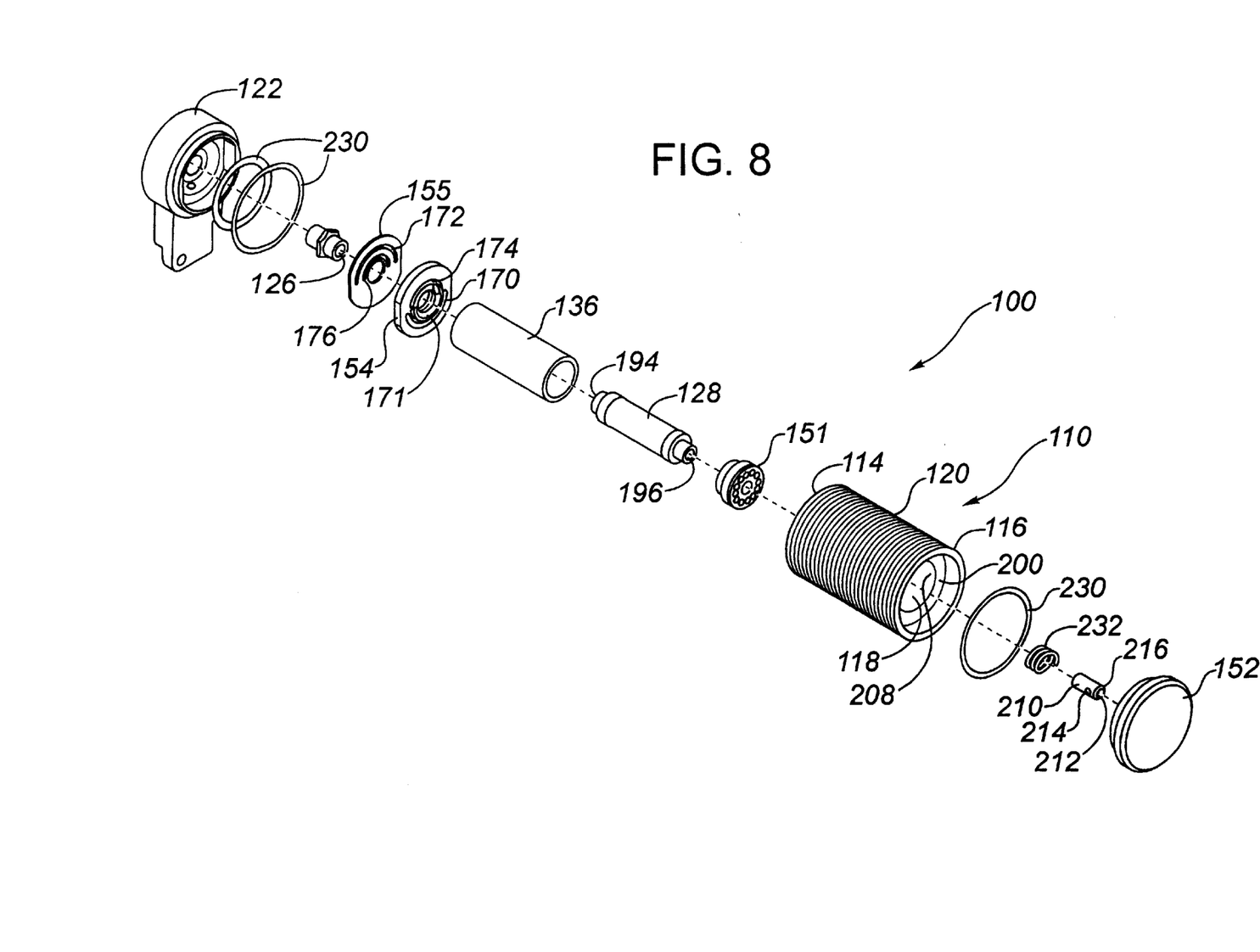
FIG. 8 is an exploded front perspective view of an oil filtration apparatus constructed in accordance with a second embodiment of the present invention teachings of the present invention.
Figure 9:
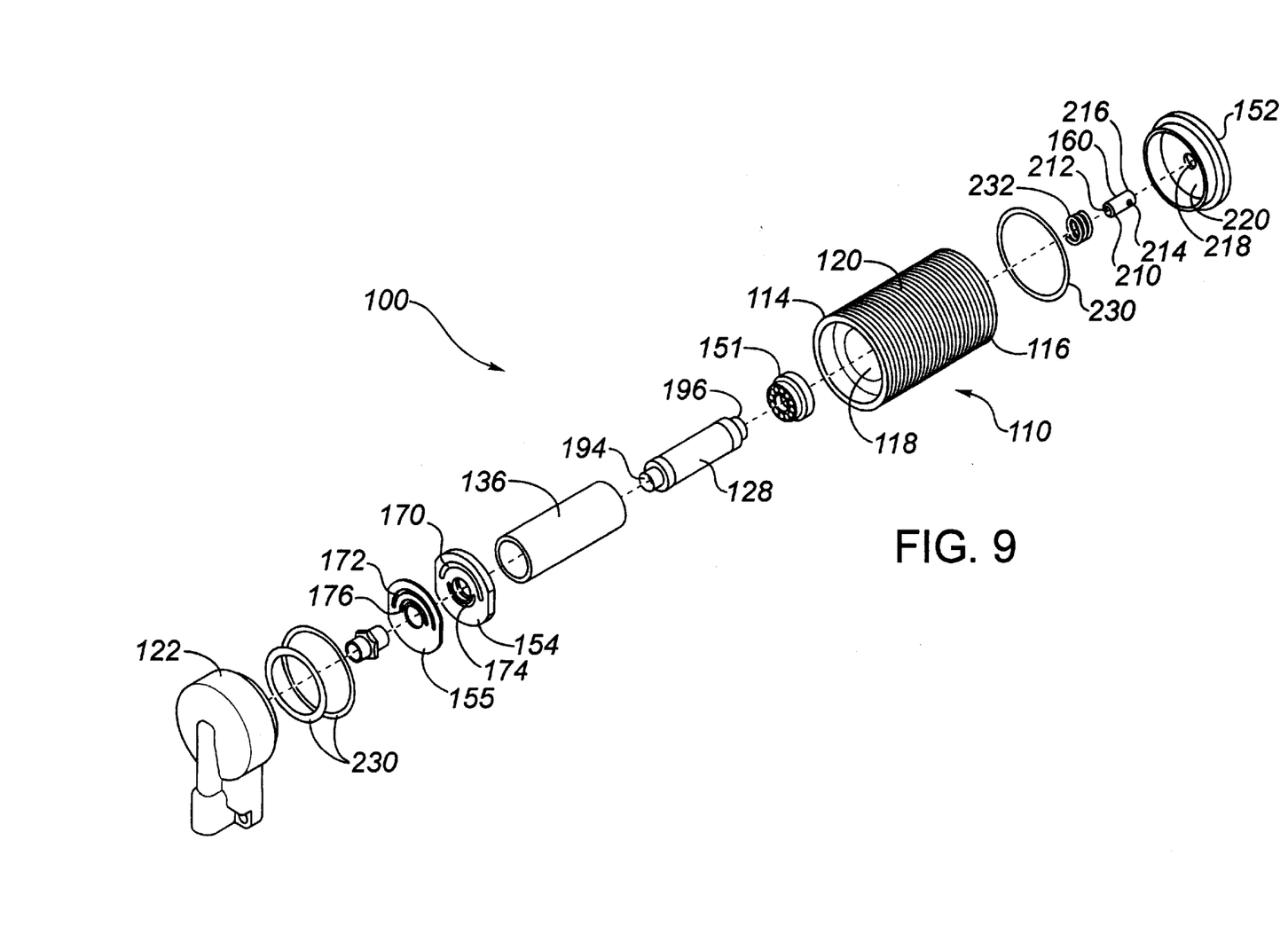
FIG. 9 is an exploded rear perspective view of the oil filtration apparatus illustrated in FIG. 8.
Figure 10:
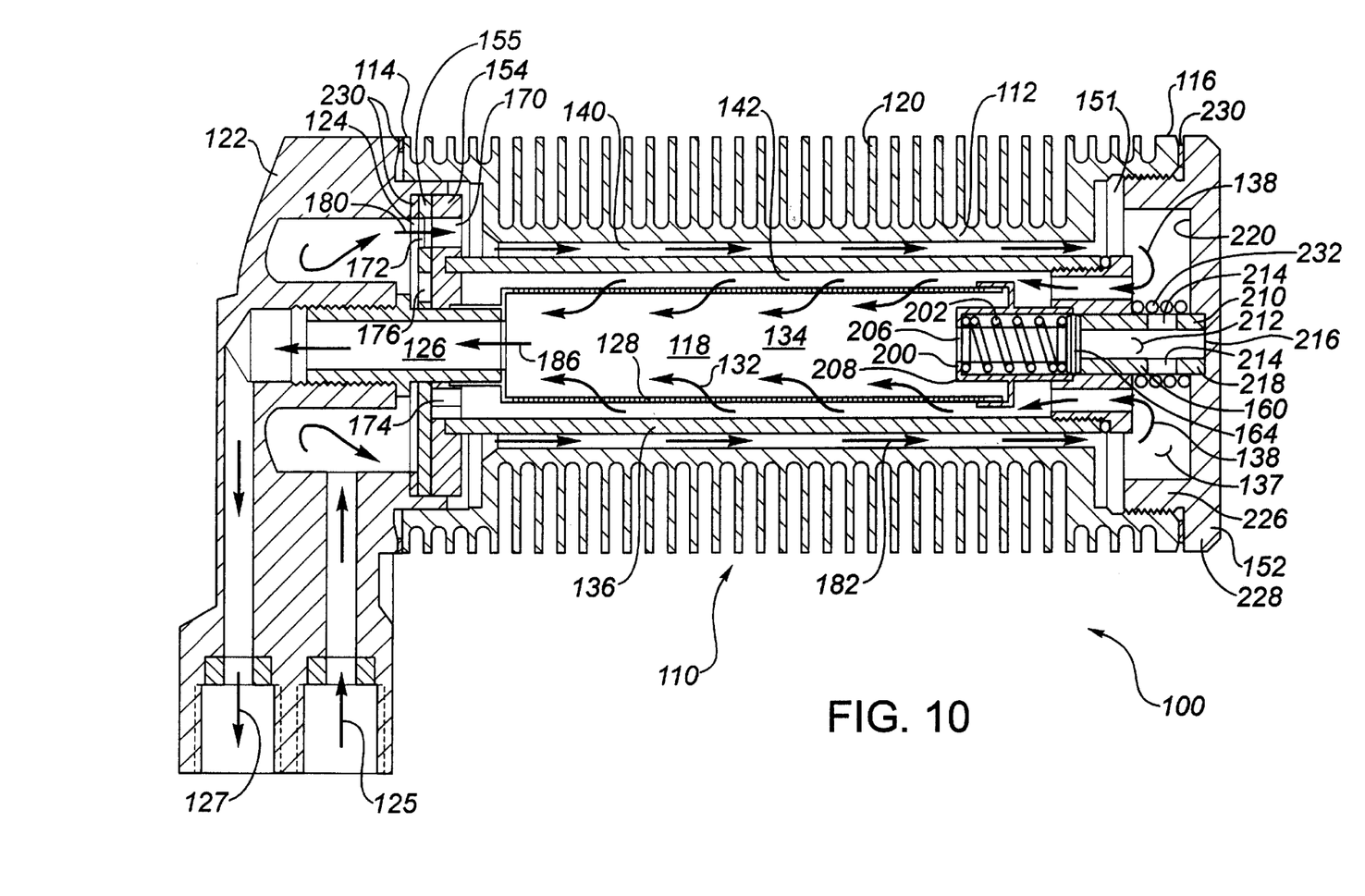
FIG. 10 is a side elevation view, in section, of the oil filtration apparatus illustrated in FIG. 8, in a cooling and filtration mode.
Figure 11:
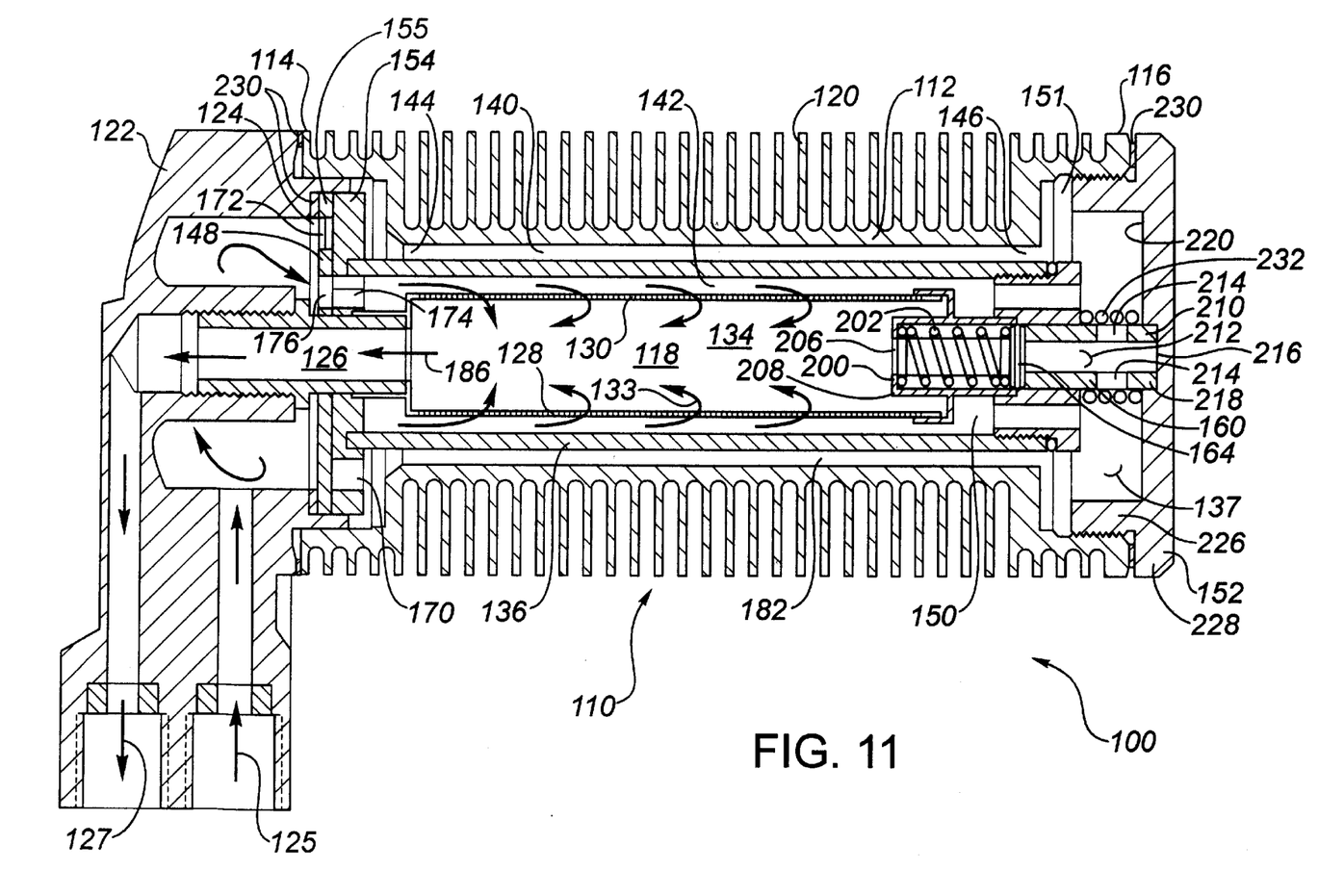
FIG. 11 is a side elevation view, in section, of the oil filtration apparatus illustrated in FIG. 8, in a filtration only mode.
Figure 14:
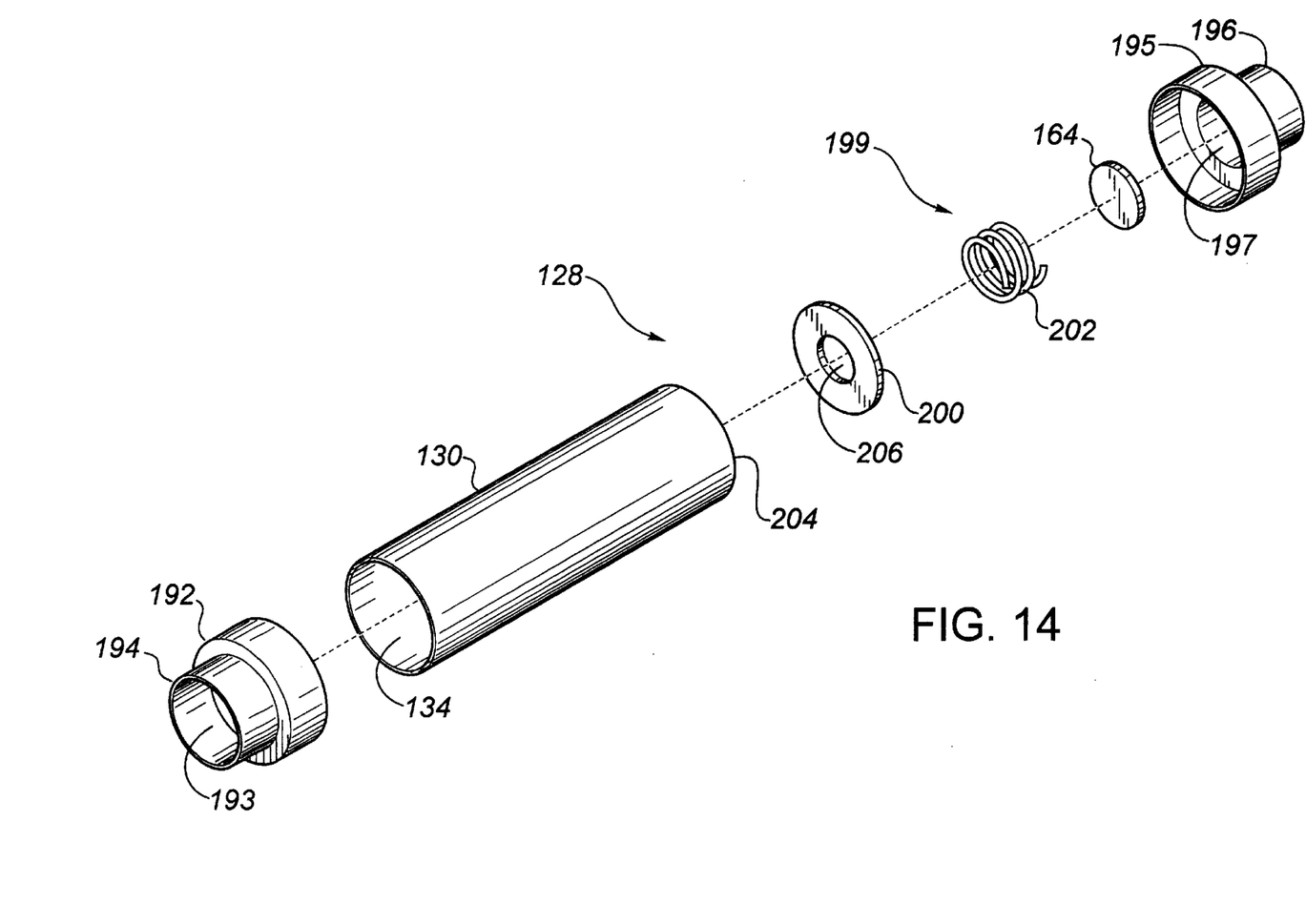
FIG. 14 is an exploded perspective view of the filter housing for the oil filtration apparatus illustrated in FIG. 8.

Referring to FIGS. 10 and 11, oil filtration apparatus 100 includes a housing 110 having a peripheral sidewall 112, a first end 114, a second end 116 and a plurality of external vanes 120 extending outwardly from peripheral sidewall 112. Referring to FIGS. 8 and 9, housing 110 has an interior cavity 118. Referring to FIGS. 10 and 11, a flow manifold 122 is positioned at first end 114 of housing 110 and has an inlet 124, access to which is made by oil as indicated by arrows 125, and an outlet 126, from which treated oil leaves apparatus 100 as indicated by arrows 127. A filter housing 128 is disposed within interior cavity 118. Referring to FIG. 14, filter housing 128 has a sidewall 130 which in the illustration is provided by a fluid permeable cylindrical filter with innumerable fluid flow openings, the presence of which is indicated in FIG. 10 by arrows 132 and in FIG. 11 by arrows 133 indicating a direction of flow of a liquid through said openings in sidewall 130. Filter housing 128 also has a central flow passage 134.

Referring to FIGS. 8 and 9, a tubular divider 136 is positioned within interior cavity 118 of housing 110 overlying filter housing 128. Referring to FIGS. 10 and 11, divider 136 serves to divide interior cavity 118 into an annular outer flow passage 140 and an annular inner flow passage 142. Outer flow passage 140 extends between first end 114 and second end 116 of housing 110 between divider 136 and peripheral sidewall 112. Outer flow passage 140 has a first end 144 at first end 114 of housing 110 and a second end 146 at second end 116 of housing 110. Inner flow passage 142 extends between first end 114 and second end 116 of housing 110 between divider 136 and filter housing 128. Inner flow passage 142 has a first end 148 at first end 114 of housing 110 and a second end 150 at second end 116 of housing 110. Referring to FIG. 10, a perforated disc 151 between an end cap 152 at second end 116 of housing 110 permits fluid communication between outer flow passage 140 and inner flow passage 142 through a cavity 137 in end cap 152, as indicated by arrows 138. End cap 152 has a cylindrical portion 226 that fits closely within second end 116 of housing 110 and a circumferential flange 226 that is in coplanar engagement with second end 116 of housing 110 when end cap 152 is installed on housing 110.

Referring to FIGS. 10 and 11, a first valve disk member 154 and a second valve disk member 155 are provided for diverting liquids flowing through inlet 124 of flow manifold 122. First valve member 154 has a first position, illustrated in FIGS. 9 and 10, and a second position, illustrated in FIGS. 8 and 11, relative to second valve member 155. Referring to FIGS. 9 and 10, when first valve member 154 is in the first position, a first passage 170 through first valve member 154 is aligned with a second passage 172 through second valve member 155 and a third passage 174 through first valve member 154 is out of alignment with a fourth passage 176 through second valve member 155. Referring to FIG. 10, when valve member 154 is in the first position, first end 148 of inner flow passage 142 is blocked. Liquids can flow only through second passage 172 and first passage 174 from inlet 124 of flow manifold 122 into first end 144 of outer flow passage 140, as indicated by arrow 180. When oil passes along outer flow passage 140, as indicated by arrows 182, a heat exchange occurs between the oil and cool air passing by external vanes 120. As the oil reaches end cap 152 it is diverted into second end 150 of inner flow passage 142 as indicated by arrows 138. As the oil passes along inner flow passage 142 the oil passes through the plurality of fluid flow openings in filter housing 128, as indicated by arrows 132, and passes through central flow passage 134 to outlet 126 of flow manifold 122, as indicated by arrow 186.

Referring to FIGS. 8 and 11, when first valve member 154 is in the second position, third passage 174 through first valve member 154 is aligned with fourth passage 176 through second valve member 155 and first passage 170 through first valve member 154 is out of alignment with second passage 172 through second valve member 155. Referring to FIG. 11, when valve member 154 is in the second position, first end 148 of outer flow passage 140 is blocked. Liquids can flow only through fourth passage 176 and third passage 174 from inlet 124 of flow manifold 122 into first end 148 of inner flow passage 142. As oil passes along inner flow passage 142 the oil passes through the plurality of fluid flow openings in filter housing 128, as indicated by arrows 132, and passes through central flow passage 134 to outlet 126 of flow manifold 122.

Referring to FIG. 14, filter housing 128 has a first end 194 and a second end 196. A first filter retaining cap 192 with an first axial bore 193 is connected to cylindrical filter/sidewall 130 at first end 194. A second filter retaining cap 195 with a second axial bore 197 is connected to cylindrical filter/sidewall 130 at second end 196. Central flow passage 134 is in communication with outlet 126 of flow manifold 122 at first end 194 of filter housing 128 through first axial bore 193 of first retaining cap 192. A pressure activated valve 199 is located between second retaining cap 195 and second end 196 of filter housing 128. Pressure sensitive valve includes a backing ring 200, a spring 202 and a valve member 164. Backing ring 200 rests against a shoulder 208 provided at one end 204 of cylindrical filter/sidewall 130. When filter housing 128 is fully assembled pressure is exerted by spring 202 to maintain valve member 164 against retaining cap 195 blocking axial bore 197. Backing ring 200 has a central bore 206 through which liquids can flow. When sufficient pressure builds up to overcome the biasing force of spring 202, pressure pushes valve member 164 away from retaining ring 195 to permit liquids to flow through central bore 206 of backing ring 200 and into central flow passage 134.

Figure 12:
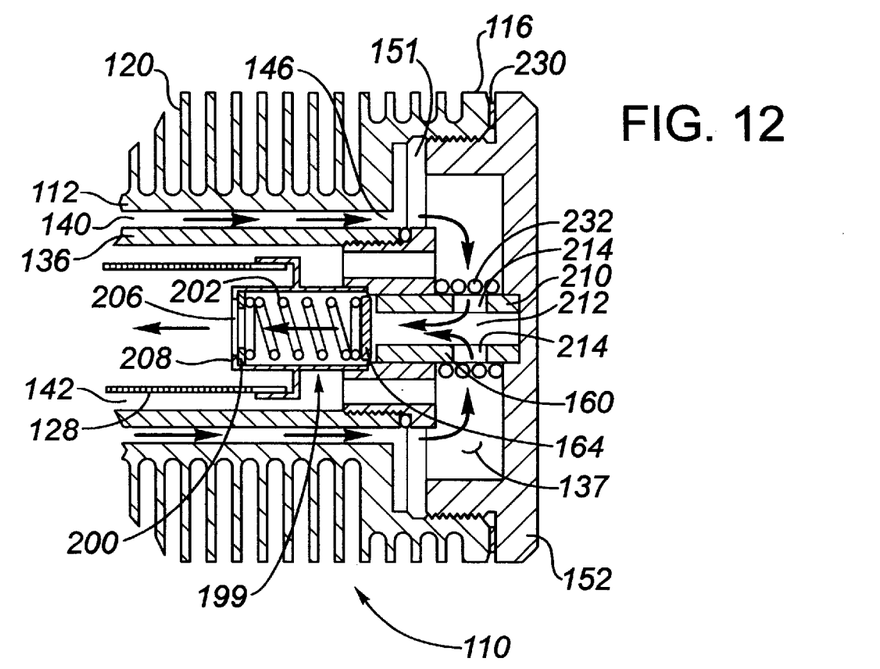
FIG. 12 is a detailed side elevation view, in section, of diverter valve flow through the oil filtration apparatus illustrated in FIG. 8, should the filter become clogged when in the cooling and filtration mode.
Figure 13:
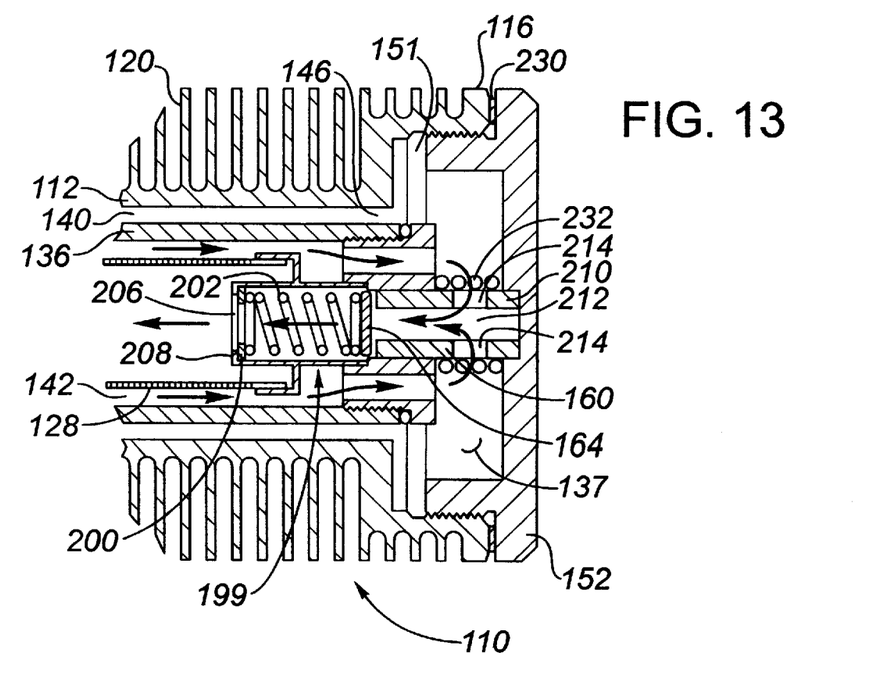
FIG. 13 is a detailed side elevation view, in section, of diverter valve flow through the oil filtration apparatus illustrated in FIG. 8, should the filter become clogged when in the filtration only node.

Referring to FIGS. 12 and 13, diverter passage 160 extends from end cap 152 to pressure activated valve 199. Referring to FIGS. 8 and 9, diverter passage 160 comprises a tubular member 210 with a central bore 212. Tubular member 210 has a remote end 216 that rests in a cavity 218 at an inner surface 220 of end cap 152, as illustrated in FIGS. 10 and 11. Tubular member 210 has radial passages 214 to permit fluids within cavity 137 of end cap 152 to enter central bore 212. Fluids are blocked from flowing through diverter passage 160 by valve member 164, until sufficient pressure builds up to overcome the biasing force of spring 202. When cylindrical filter becomes plugged so that fluids can no longer pass through sidewall 130, the flow of oil along either outer flow passage 140, as illustrated in FIG. 12, or along inner flow passage 142, as illustrated in FIG. 13, is restricted, and a pressure of the oil in housing 110 increases. The increased pressure acts upon valve member 164 to compress spring 202, moving valve member 164 moves away from retaining cap 195 and permitting flow through diverter passage 160. Oil can then pass freely from diverter passage 160, past pressure sensitive member 164, through central bore 206 of backing ring 200 into central flow passage 134 of filter housing 128. This permits oil to be diverted through diverter passage 160 to central flow passage 134 without passing through cylindrical filter/sidewall 130.

It is important that the selection of either the filter/cooler mode, as illustrated in FIG. 10, or the filtration only mode, illustrated in FIG. 11, makes no difference in the pressure within oil filtration apparatus 10. Care must be taken in sizing the flow paths to make them substantially equal in terms of the flow rate they are capable of managing. In any oil filtration apparatus care must be taken to ensure that its capacity is suitable to the engine, so that a back pressure is not created. Referring to FIGS. 8 through 11, gasket seals 230 are located at interfaces between surfaces of adjacent components to prevent leakage of oil from apparatus 100 through said interfaces. A spring 232 is positioned in end cap 152 around tubular member 210. The purpose of spring 232 is to retain all components in their respective positions when end cap 152 is threaded onto housing 110.

The use and operation of apparatus 100 will now be described with reference to FIGS. 8 through 15. Apparatus 100 is intended to be installed on a motor. When installed flow manifold 122 is fixed in position. The operator of the motor can select either a cooling and filtration mode or a filtration only mode. The selection is made by grasping end cap 152 and imparting a partial rotation of end cap 152 relative to stationary flow manifold 122. Valve member 155 is fixed in position to flow manifold 122. Valve member 154 is indirectly coupled to and must move with end cap 152. Referring to FIG. 8, valve disk member 154 has an annular groove 171 into which is inserted divider 136. The interlock between valve disk member 154 and divider 136 is illustrated in FIG. 11. Rotation of end cap 152, rotates divider 136 which, in turn, results in a change in the positioning of valve disk member 154 relative to valve disk member 155. When valve member 154 is in the first position, first end 148 of inner flow passage 142 is blocked. Liquids can flow only through second passage 172 and first passage 174 from inlet 124 of flow manifold 122 into first end 144 of outer flow passage 140, as indicated by arrow 180. When the oil passes along outer flow passage 140, as indicated by arrows 182, a heat exchange occurs between the oil and cool air passing by external vanes 120. As the oil reaches end cap 152 it is diverted into second end 150 of inner flow passage 142 as indicated by arrows 138. As the oil passes along inner flow passage 142 the oil passes through the fluid permeable cylindrical filter forming sidewall 130 of and providing fluid flow openings into filter housing 128, as indicated by arrows 132, and passes through central flow passage 134 to outlet 126 of flow manifold 122, as indicated by arrow 186. Referring to FIGS. 8 and 11, when first valve member 154 is in the second position, third passage 174 through first valve member 154 is aligned with fourth passage 176 through second valve member 155 and first passage 170 through first valve member 154 is out of alignment with second passage 172 through second valve member 155. Referring to FIG. 11, when valve member 154 is in the second position, first end 148 of outer flow passage 140 is blocked. Liquids can flow only through fourth passage 176 and third passage 174 from inlet 124 of flow manifold 122 into first end 148 of inner flow passage 142. As oil passes along inner flow passage 142 the oil passes through the fluid permeable cylindrical filter forming sidewall 130 of and providing fluid flow openings into filter housing 128, as indicated by arrows 132, and passes through central flow passage 134 to outlet 126 of flow manifold 122. Should the filter become clogged, pressure acts upon valve member 164 to compress spring 202, moving valve member 164 moves away from retaining cap 195 and permit flow through diverter passage 160. Oil can then pass freely from diverter passage 160, past pressure sensitive member 164, through central bore 206 of backing ring 200 into central flow passage 134 of filter housing 128 and out outlet 126 of flow manifold 122.

Figure 15:
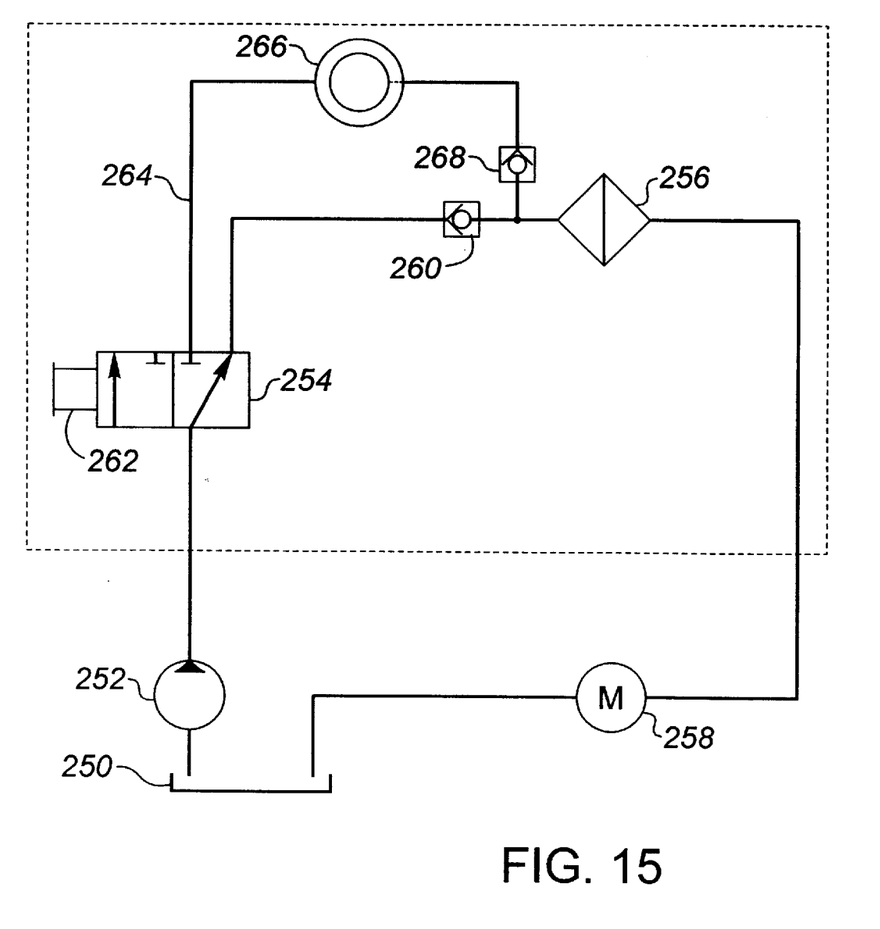
FIG. 15 is a schematic of the filter housing for the oil filtration apparatus illustrated in FIG. 8, equipped with an automatic switch.

Referring to FIG. 15, although manual switching is preferred it is possible for the switching to take place automatically. Oil is pumped from a reservoir 250 by means of a pump 252. The oil is pumped by pump 252 past switch 254 through filter 256 to motor 258 and then back to reservoir 250. A one way check valve 260 is provided to ensure that the oil can flow in only one direction. The position of switch 254 is controlled by a thermocouple 262. When the temperature of the oil reaches a preset plateau, thermocouple 262 causes switch 254 to change position, which results in the oil being diverted through a flow loop 264 leading to cooler 266. Flow loop 264 also has a one way check valve 268 to ensure that the oil can flow in only one direction.

It will be apparent to one skilled in the art that modifications may be made to the illustrated embodiment without departing from the spirit and scope of the invention as hereinafter defined in the claims.

What is claimed is:

1. An oil filtration apparatus, comprising:
 a housing having a peripheral sidewall, a first end, a second end, an internal cavity and a plurality of external vanes extending outwardly from the peripheral sidewall between the first end and the second end;
 a flow manifold positioned at the first end of the housing having an inlet and an outlet;
 a filter housing disposed within the interior cavity of the housing having a sidewall with fluid flow openings and a central flow passage in communication with the outlet of the flow manifold, the filter housing being adapted to receive a filter;
 a plurality of outer flow passages extending through the peripheral sidewall of the housing with each of the outer flow passages extending along one of the external vanes, the outer flow passages each having a first end at the first end of the housing and a second end at the second end of the housing;
 at least one inner flow passage extending between the first end and the second end of the housing beside the filter housing, the at least one inner flow passage having a first end at the first end of the housing and a second end at the second end of the housing;
 an end cap at the second end of the housing permitting fluid communication between the outer flow passages and the inlet of the flow manifold;
 the inlet of the flow manifold communicating with the second end of the outer flow passages with a heat exchange occurring between oil passing along the outer flow passages and cool air passing by the external vanes, as the oil reaches the first end of the outer flow passages it is diverted into the first end of the at least one inner flow passage, as the oil passes along the at least one inner flow passage the oil passes through the fluid flow openings in the filter housing and then through the central flow passage to the outlet of the flow manifold;
 a manually rotatable valve member for diverting liquids flowing through the inlet of the flow manifold is provided having a first position and a second position;
 when the valve member is rotated to the first position the second end of the at least one inner flow passage is blocked and liquids can only flow from the inlet of the flow manifold into the second end of the outer flow passages with a heat exchange occurring between oil passing alone the outer flow passages and cool air passing by the external vanes, as the oil reaches the first end of the outer flow passages it is diverted into the first end of the at least one inner flow passage, as the oil passes along the at least one inner flow passage the oil passes through the fluid flow openings in the filter housing and passes through the central flow passage to the outlet of the flow manifold; and
 when the valve member is rotated to the second position the second end of each of the outer flow passages is blocked and liquids can only flow from the inlet of the flow manifold into the second end of the at least one inner flow passage, as the oil passes along the at least one inner flow passage the oil passes through the fluid flow openings in the filter housing and passes through the central flow passage to the outlet of the flow manifold.

2. An oil filtration apparatus, comprising:
 a housing having a peripheral sidewall, a first end, a second end, an internal cavity and a plurality of external vanes extending outwardly from the peripheral sidewall;
 a flow manifold positioned at the first end of the housing having an inlet and an outlet;
 a filter housing disposed within the interior cavity of the housing having a sidewall with fluid flow openings and a central flow passage in communication with the outlet of the flow manifold, the filter housing being adapted to receive a filter;
 a divider positioned within the interior cavity of the housing overlying the filter housing and dividing the interior cavity into at least one outer flow passage and at least one inner flow passage, the at least one outer flow passage extending between the first end and the second end of the housing between the divider and the peripheral sidewall, the at least one outer flow passage having a first end at the first end of the housing and a second end at the second end of the housing, the at least one inner flow passage extending between the first end and the second end of the housing between the divider and the filter housing, the at least one inner flow passage having a first end at the first end of the housing and a second end at the second end of the housing;
 an end cap at the second end of the housing permitting fluid communication between the at least one outer flow passage and the at least one inner flow passage;
 the inlet of the flow manifold communicating with the first end of the at least one outer flow passage with a heat exchange occurring between oil passing along the at least one outer flow passage and cool air passing by the external vanes, as the oil reaches the end cap it is diverted into the second end of the at least one inner flow passage, as the oil passes along the at least one inner flow passage the oil passes through the fluid flow openings in the filter housing and then through the central flow passage to the outlet of the flow manifold;
 a manually rotatable valve member for diverting liquids flowing through the inlet of the flow manifold is provided having a first position and a second position;
 when the valve member is rotated to the first position the first end of the at least one inner flow passage is blocked and liquids can only flow from the inlet of the flow manifold into the first end of the at least one outer flow passage with a heat exchange occurring between oil passing along the at least one outer flow passage and cool air passing by the external vanes, as the oil reaches the end cap it is diverted into the second end of the at least one inner flow passage, as the oil passes along the at least one inner flow passage the oil passes through the fluid flow openings in the filter housing and passes through the central flow passage to the outlet of the flow manifold; and when the valve member is rotated to the second position the first end of the at least one outer flow passage is blocked and liquids can only flow from the inlet of the flow manifold into the first end of the at least one inner flow passage, as the oil passes along the at least one inner flow passage the oil passes through the fluid flow openings in the filter housing and passes through the central flow passage to the outlet of the flow manifold.

3. The oil filtration apparatus as defined in claim 2, wherein a diverter passage extends from the end cap to the central flow passage, a pressure sensitive valve member being positioned in the diverter passage, such that an increase in pressure within the housing as a result of a filter in the filter housing becoming plugged triggers the pressure sensitive valve permitting oil to be diverted through the diverter passage directly to the central flow passage without passing through the filter.

4. An oil filtration apparatus, comprising:

a housing having a peripheral sidewall, a first end, a second end, an internal cavity and a plurality of parallel spaced external vanes extending outwardly from the peripheral sidewall and around the housing;

a flow manifold positioned at the first end of the housing having an inlet and an outlet;

a filter housing disposed within the interior cavity of the housing having a sidewall with fluid flow openings and a central flow passage in communication with the outlet of the flow manifold, the filter housing being adapted to receive a filter;

a divider positioned within the interior cavity of the housing overlying the filter housing and dividing the interior cavity into an annular outer flow passage and an annular inner flow passage, the outer flow passage extending between the first end and the second end of the housing between the divider and the peripheral sidewall, the outer flow passage having a first end at the first end of the housing and a second end at the second end of the housing, the inner flow passage extending between the first end and the second end of the housing between the divider and the filter housing, the inner flow passage having a first end at the first end of the housing and a second end at the second end of the housing;

an end cap at the second end of the housing permitting fluid communication between the outer flow passage and the inner flow passage;

a manually rotatable valve member for diverting liquids flowing through the inlet of the flow manifold is provided having a first position and a second position;

when the valve member is in the first position the first end of the inner flow passage is blocked and liquids can only flow from the inlet of the flow manifold into the first end of the outer flow passage with a heat exchange occurring between oil passing along the outer flow passage and cool air passing by the external vanes, as the oil reaches the end cap it is diverted into the second end of the inner flow passage, as the oil passes along the inner flow passage the oil passes through the fluid flow openings in the filter housing and passes through the central flow passage to the outlet of the flow manifold;

when the valve member is in the second position the first end of the outer flow passage is blocked and liquids can only flow from the inlet of the flow manifold into the first end of the inner flow passage, as the oil passes along the inner flow passage the oil passes through the fluid flow openings in the filter housing and passes through the central flow passage to the outlet of the flow manifold;

a diverter passage extending from the end cap to the central flow passage;

a pressure sensitive valve member being positioned in the diverter passage, such that an increase in pressure within the housing as a result of a filter in the filter housing becoming plugged triggers the pressure sensitive valve permitting oil to be diverted through the diverter passage directly to the central flow passage without passing through the filter.

\* \* \* \* \*

UNITED STATES PATENT AND TRADEMARK OFFICE
CERTIFICATE OF CORRECTION

PATENT NO.      : 6,261,448 B1
DATED           : July 17, 2001
INVENTOR(S)     : G. Merchant et al.

It is certified that error appears in the above-identified patent and that said Letters Patent is hereby corrected as shown below:

<u>Title page,</u>
Item [30], Foreign Application Priority Data, please insert in appropriate order: -- Jul. 5, 1999 (CA) 2276828 --

<u>Column 8,</u>
Line 4, "alone" should read -- along --

Signed and Sealed this

Twenty-seventh Day of August, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,261,448 B1
DATED : July 17, 2001
INVENTOR(S) : G. Merchant et al.

It is certified that error appears in the above-identified patent and that said Letters Patent is hereby corrected as shown below:

Title page,
Item [30], Foreign Application Priority Data, delete "July 5, 1999  (CA)  2276828".

Signed and Sealed this

Twelfth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.     : 6,261,448 B1
DATED          : July 17, 2001
INVENTOR(S)    : G. Merchant et al.

It is certified that error appears in the above-identified patent and that said Letters Patent is hereby corrected as shown below:

<u>Title page,</u>
Item [30], Foreign Application Priority Data (as in Certificate of Correction issued August 27, 2002), delete "July 5, 1999 (CA) 2276828".

This certificate supersedes Certificate of Correction issued November 12, 2002.

Signed and Sealed this

Third Day of June, 2003

JAMES E. ROGAN
*Director of the United States Patent and Trademark Office*